US006594754B1

(12) United States Patent
Jourdan et al.

(10) Patent No.: US 6,594,754 B1
(45) Date of Patent: Jul. 15, 2003

(54) MAPPING DESTINATION LOGICAL REGISTER TO PHYSICAL REGISTER STORING IMMEDIATE OR RENAMED SOURCE REGISTER OF MOVE INSTRUCTION AND USING MAPPING COUNTERS

(75) Inventors: Stephan J. Jourdan, Hillsboro, OR (US); Gad S. Sheaffer; Ronny Ronen, both of Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/348,404

(22) Filed: Jul. 7, 1999

(51) Int. Cl.[7] .............................................. G06F 9/315
(52) U.S. Cl. ........................ 712/217; 712/216; 712/225
(58) Field of Search ................................ 712/217, 225, 712/216

(56) References Cited

U.S. PATENT DOCUMENTS

| | | | | |
|---|---|---|---|---|
| 5,644,746 A | * | 7/1997 | Holt et al. ................... | 712/217 |
| 5,838,941 A | | 11/1998 | Valentine et al. | |
| 5,911,057 A | | 6/1999 | Shiell .......................... | 712/217 |
| 6,094,716 A | * | 7/2000 | Witt ............................. | 712/23 |
| 6,122,656 A | * | 9/2000 | Witt ............................. | 709/100 |
| 6,141,747 A | | 10/2000 | Witt ............................. | 712/225 |
| 6,338,134 B1 | * | 1/2002 | Leung et al. ................ | 712/217 |

OTHER PUBLICATIONS

"Exdeeding the Dataflow Limit Via Value Prediction", Lipasti, et al., Dept. of Electrical and Computer Engineering Carnegie Mellon Universite, Pittsburgh, PA, 1996 IEEE, pp. 226–237.

"Dynamic Instruction Reuse", Sodani, et al., Computer Services Dept. U of WI–Madison, 1997 ACM, p. 12.

"Dynamic Speculation and Synchronization of Data Dependences", Moshovos, et al., Computer Sciences Dept. U of WI–Madison, Wisconsin, 1997, pp. 12.

"Streamlining Inter–operation Memory Communication via Data Dependence Predication" Moshovos, et al., Computer Sciences Dept., U of WI, Madison Wisconsin, IEEE 1997, pp. 235–245.

"A Novel Renaming Scheme to Exploit value Temporal Locality through Physical Register Reuse and Unification", Jourdan, et al., Intel Corp., IEEE 1998, pp. 216–225.

Moudgill et al., "Register Renaming and Dynamic Speculation: An Alternative Approach," in Proceedings of the 26th Annual International Symposium on Microarchitecture, IEEE, Dec. 1993, Austin, TX, pp. 202–213.

* cited by examiner

Primary Examiner—Kenneth S. Kim
(74) Attorney, Agent, or Firm—Seth Z. Kalson

(57) ABSTRACT

A computer architecture to process move instructions by allowing multiple mappings between logical registers and the same physical register. In one embodiment, a counter is associated with each physical register to indicate when the physical register is free. A register-to-register move instruction is processed by mapping the logical destination register of the move instruction to the same physical register to which the logical source register of the move instruction is mapped. An immediate-to-register move instruction is processed by mapping the logical destination register of the move instruction to a physical register storing the immediate.

24 Claims, 3 Drawing Sheets

_US 6,594,754 B1_

MAPPING DESTINATION LOGICAL REGISTER TO PHYSICAL REGISTER STORING IMMEDIATE OR RENAMED SOURCE REGISTER OF MOVE INSTRUCTION AND USING MAPPING COUNTERS

FIELD

Embodiments of the present invention relate to computer technology, and more particularly, to processor architecture.

BACKGROUND

For many microprocessors, executing a move instruction usually involves moving a value from one register to another register, or moving an immediate to a register. Because of the frequency of such move instructions, processor performance may be increased if move instructions are efficiently processed.

Most instructions operate on several source operands and generate results. They name, either explicitly or through an indirection, the source and destination locations where values are read from or written to. A name may be either a logical (architectural) register or a location in memory.

Usually, the number of physical registers available in a microprocessor exceeds the number of logical registers, so that register renaming may be utilized to increase performance. In particular, for out-of-order processors, register renaming allows instructions to be executed out of their original program order. Thus, for many out-of-order processors, a move instruction is renamed so that logical registers named in the original move instruction are renamed to physical registers.

Renaming a logical register involves mapping a logical register to a physical register. These mappings are stored in a RAT (Register Alias Table). A RAT maintains the latest mapping for each logical register. A RAT is indexed by logical registers, and provides mappings to corresponding physical registers (dependency-tracking).

Illustrated in FIG. 1 is a register renaming and dependency tracking scheme involving three structures: RAT 110, active list (AL) 102, and free list (FL) 104. For each logical register specified by a renamed instruction (or renamed micro-instruction), an unused physical register from FL 104 is allocated and RAT 110 is updated with this new mapping. Physical registers are free to be used again (i.e., reclaimed) once they cannot be referenced anymore by instructions in the current instruction window.

Based upon the data structures depicted in FIG. 1, one method for register reclaiming is to reclaim a physical register only when the instruction that evicted it from RAT 110, i.e., the instruction that created a new mapping to the physical register, retires. As a result, whenever a new mapping updates RAT 110, the evicted old mapping is pushed into AL 102. (An AL entry is associated with each instruction in the instruction window.) When an instruction retires, the physical register of the old mapping recorded in AL 102, if any, is reclaimed and pushed into FL 104. This cycle is depicted in FIG. 1.

For many instructions belonging to the Intel® Architecture 32-bit (IA-32) instruction set (Intel® is a registered trademark of Intel Corporation, Santa Clara, Calif.), one of the source registers is also used as the destination register. If the value stored in this source register is needed by subsequent (in program order) instructions, a register-move instruction may be inserted prior to the subsequent instruction to copy the source operand in the source register to another logical location so that it can be accessed by the subsequent instruction. (IA-32 move instructions operating on memory operands are considered load or store instructions.)

Another reason for the insertion of register-move instructions in IA-32 code is to set the parameter values in the appropriate registers prior to a procedure call. The IA-32 Application Binary Interface (ABI) requires parameters for a procedure call to be passed on the stack. However, compilers often use alternate, non-standard, register-based parameter passing, when possible. For RISC instruction set architecture machines, register-move instructions are mainly used for parameter passing.

As a result, the number of register-move instructions may be quite significant in typical IA-32 programs, as well as for programs written for other processor architectures. Therefore, it is useful to provide for the efficient execution of register-move instructions with efficient register renaming and reclaiming schemes.

SUMMARY

Embodiments of the present invention are directed to microprocessors that map more than one logical register to the same physical register. For one embodiment, a microprocessor comprises physical registers, a decoder to decode a register-to-register move instruction indicating a source logical register and a destination logical register, and a register allocation table in which the destination logical register is mapped to the same physical register that the source logical register is mapped to. For another embodiment, a counter is associated with each physical register to indicate when a physical register is free. For another embodiments, an immediate-to-register move instruction is processed by mapping the logical destination register of the move instruction to a physical register already storing the immediate.

DETAILED DESCRIPTION OF THE EMBODIMENTS

Figure 2:
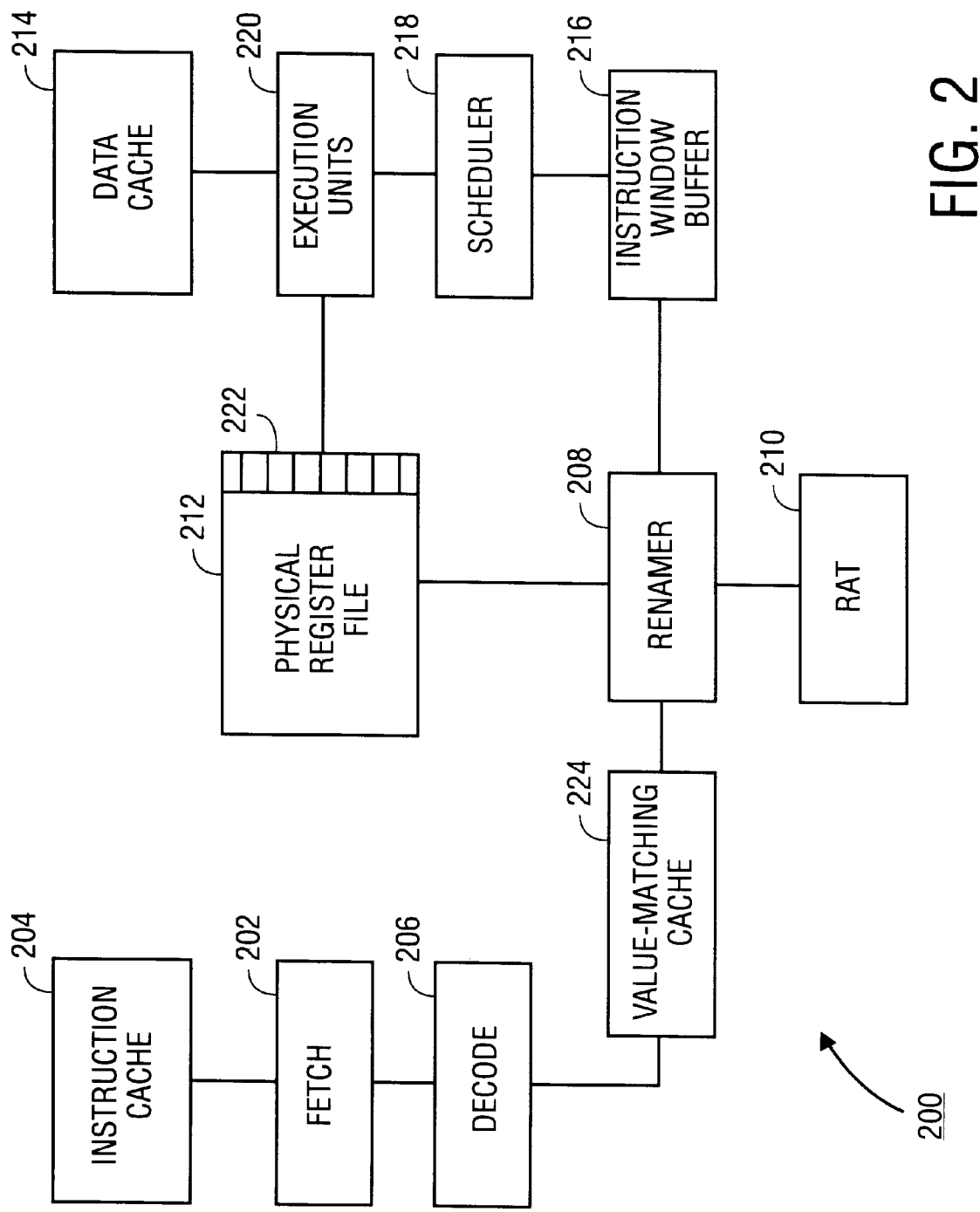
FIG. 2 illustrates the high level architecture of a microprocessor according to an embodiment of the present invention.

Embodiments of the present invention may be described by referring to out-of-order microprocessor 200 of FIG. 2. (For simplicity, not all functional units of microprocessor 200 are illustrated.) In microprocessor 200, fetch unit 202 fetches instructions from instruction cache 204, and decode unit 206 decodes these instructions. For a CISC (Complex Instruction Set Computer) architecture, decode unit 206 decodes a complex instruction into one or more micro-instructions. Usually, these micro-instructions define a load-store type architecture, so that micro-instructions involving memory operations are simple load or store operations. However, the present invention may be practiced for other architectures, such as for example RISC (Reduced Instruction Set Computer) or VLIW (Very Large Instruction Word) architectures.

In a RISC architecture, instructions are not decoded into micro-instructions. Because the present invention may be practiced for RISC architectures as well as CISC architectures, we shall not make a distinction between instructions and micro-instructions unless otherwise stated, and will simply refer to these as instructions.

In FIG. 2, the register renaming functional unit is indicated by renamer unit 208, where RAT (Register Allocation Table) 210 stores current mappings between logical registers and physical registers. The physical registers are indicated by register file 212. Every logical register has a mapping to a physical register in physical register file 212, where the mapping is stored in RAT 210 as an entry. An entry in RAT 210 is indexed by a logical register and contains a pointer to a physical register in physical register file 212. Some registers in physical register file 212 may be dedicated for integers whereas others may be dedicated for floating point numbers, but for simplicity these distinctions are not indicated in FIG. 2.

During renaming of an instruction, current entries in the RAT provide the required mapping for renaming the source logical register(s) of the instruction, and a new mapping is created for the destination logical register of the instruction. This new mapping evicts the old mapping in the RAT, and the RAT is updated with the new mapping.

Table 1 illustrates an example of register renaming. In Table 1, four instructions in original program order are provided in the first column. Renamed instructions are indicated in the second column. Next to each renamed instruction are the current entries in the RAT after instruction renaming. The final column provides the mapping evicted by instruction renaming. For simplicity, only three logical registers, LRa, LRb, and LRb, are considered. A physical register is denoted by PRi where i is an integer. The first entry in Table 1 provides the current state of the RAT before the first listed instruction is renamed.

For example, in Table 1 the first instruction LRa+2→LRa (indicating that the immediate 2 is added to the value in logical register LRa and the result is stored in logical register LRa) is renamed to PR1+2→PR2, where physical register PR2 was assumed to be available. For this instruction, a new mapping LRa→PR2 was created and the old mapping LRa→PR1 was evicted from the RAT.

Note that there is a true dependence of the second and fourth instructions upon the first instruction, and a true dependence of the third instruction upon the second instruction. However, register renaming has removed the output dependency between the second and fourth instructions, as well as the anti-dependence between the third and fourth instructions, so that the second, third, and fourth instructions may be executed out of order provided the execution order follows the various true dependencies.

TABLE 1

| Instruction | Renamed Instruction | RAT | Evicted Mapping |
|---|---|---|---|
| ... | ... | LRa → PR1<br>LRb → PR11<br>LRc → PR10 | ... |
| LRa + 2 → LRa | PR1 + 2 → PR2 | LRa → PR2<br>LRb → PR11<br>LRc → PR10 | LRa → PR1 |
| LRa + 3 → LRb | PR2 + 3 → PR12 | LRa → PR2<br>LRb → PR12<br>LRc → PR10 | LRb → PR11 |

TABLE 1-continued

| Instruction | Renamed Instruction | RAT | Evicted Mapping |
|---|---|---|---|
| LRb + 2 → LRc | PR12 + 2 → PR13 | LRa → PR2<br>LRb → PR12<br>LRc → PR13 | LRc → PR10 |
| LRa + 5 → LRb | PR2 + 5 → PR14 | LRa → PR2<br>LRb → PR14<br>LRc → PR13 | LRb → PR12 |

Renamed instructions are placed in instruction window buffer 216. Entries in instruction window buffer 216 contain the opcode of the renamed instruction, as well as other fields to be described later. For this embodiment, the results of instructions are not stored in buffer 216 but reside in physical register file 212.

Instruction window buffer 216 allows for instruction retirement in original program order. For CISC architectures, a complex instruction is retired when all micro-instructions making up the complex instruction are retired together. Buffer 216 is operated as a circular buffer, where a first pointer points to the next instruction to be retired and a second pointer points to the next available entry for a newly decoded instruction. Incrementing the pointers is done in modulo-N arithmetic, where N is the number of available entries in buffer 216. When an instruction retires, the first pointer is incremented. When a decoded instruction is placed in buffer 216, the second pointer is incremented. The pointers are incremented by one for each decoded instruction in a RISC architecture, and may be incremented by more than one for CISC architectures.

For a store instruction that writes its result to a memory location, data cache 214 (part of the memory hierarchy) is updated upon instruction retirement. For an instruction that writes its result to a logical register, no write need be done upon retirement because there are no registers dedicated as logical registers. For such an instruction, physical register file 212 has the result of the retiring instruction in the physical register to which the destination logical register was mapped when the instruction was renamed.

Scheduler 218 schedules instructions to execution units 220 for execution. The scheduling function may, for example, be realized by reservation stations (not shown) implementing Tomasulo's algorithm (or variations thereof). Execution units 220 may retrieve data from or send data to data cache 214 or physical register file 212, depending upon the instruction (or micro-instruction) to be executed.

In other embodiments of the present invention, the information content contained in the data structures of physical register field 212 and instruction window buffer 216 may be realized by different functional units. For example, a re-order buffer may replace instruction window buffer 216 and physical register file 212, so that results are stored in the re-order buffer, and in addition, registers in a register file are dedicated as logical registers. For this type of embodiment, the result of an instruction specifying a write to a logical register is written to a logical register upon instruction retirement.

We now distinguish two types of move instructions: register-to-register moves and immediate-to-register moves. In a register-to-register move, a value is moved from one register, the source logical register, to another register, the destination logical register. In an immediate-to-register move, an immediate value is moved to a logical register.

In embodiments of the present invention, move instructions are executed by mapping more than one logical register to the same physical register. The execution of a register-to-register move instruction is performed by mapping the destination logical register of the move instruction to the physical register mapped by the source logical register of the move instruction.

The execution of an immediate-to-register move instruction is performed by accessing value-matching cache 224. Entries in value matching cache 224 are indexed by values, where a cache entry associates a value with a physical register storing that value. Value matching cache 224 may have fewer entries than the number of physical registers. If there is a hit in value matching cache 224, then the destination logical register of the move instruction is mapped to the physical register indicated by value-matching cache 224. If there isn't a hit, then the move execution is performed as in prior art architectures, and value-matching cache 224 is updated.

Physical register file 212 may itself serve the function of a value-matching cache, so that cache 224 is not needed. In this case, register file 212 would need an extra port to perform parallel tag matching, where the tag is the value stored in a physical register.

As discussed above, register-to-register move instructions and immediate-to-register move instructions (provided there is a hit in value-matching cache 224 for the latter type of move) are executed by creating multiple mappings in which more than one logical register is mapped to the same physical register. Effectively, such move instructions are "eliminated" in the sense that they no longer are performed by execution units 220. Instead, move instructions are performed during the renaming stage. These instructions remain in instruction window buffer 216 ready to be retired. Dependency graphs are collapsed since instructions dependent on such move instructions are made directly dependent on the real producer (dependencies are redirected). There may also be a reduction in the requirement for physical registers, and there may be fewer writes into the register file.

Embodiments of the present invention provide a mechanism for mapping more than one logical register to the same physical register (a many-to-one mapping). These many-to-one mappings are facilitated by utilizing set of counters 222, where a counter is provided for each physical register in physical register file 212. The value of a counter indicates whether its associated physical register is free. For simplicity of discussion, we may take a counter value of zero to imply that there are no current mappings to the physical register and that it is free. (However, embodiments of the present invention are not limited to using counter values of zero to indicate that a physical register is free.)

Each time a new mapping between a logical register and a physical register is created, the counter associated with that physical register is changed by a first increment. In some embodiments, the first increment is positive, so that the counter is incremented for each new mapping. When a mapping to a physical register is no longer needed, its counter is changed by a second increment, opposite in sign to the first increment.

A physical register becomes free again if there are no longer any mappings to it that are needed by in-flight instructions. A counter associated with a physical register is changed by the second increment (e.g., the counter is decremented) each time an instruction that evicted a mapping to the physical register retires. When a counter reaches a pre-determined value (e.g., zero), then that physical register is free.

In some embodiments of the present invention, instruction window buffer 216 has pointer fields for pointing to physical registers. When an instruction placed in instruction window buffer 216 has evicted a mapping in RAT 210, a pointer field associated with the instruction is set to point to the physical register of the evicted mapping. These pointer fields comprise an active list. (The free list may be a queue of pointers pointing to free physical registers.) As each instruction retires in instruction window buffer 216, the counter associated with the physical register (if any) pointed to by the pointer field associated with the retiring instruction is changed by the second increment (e.g., the counter is decremented).

Figure 1:
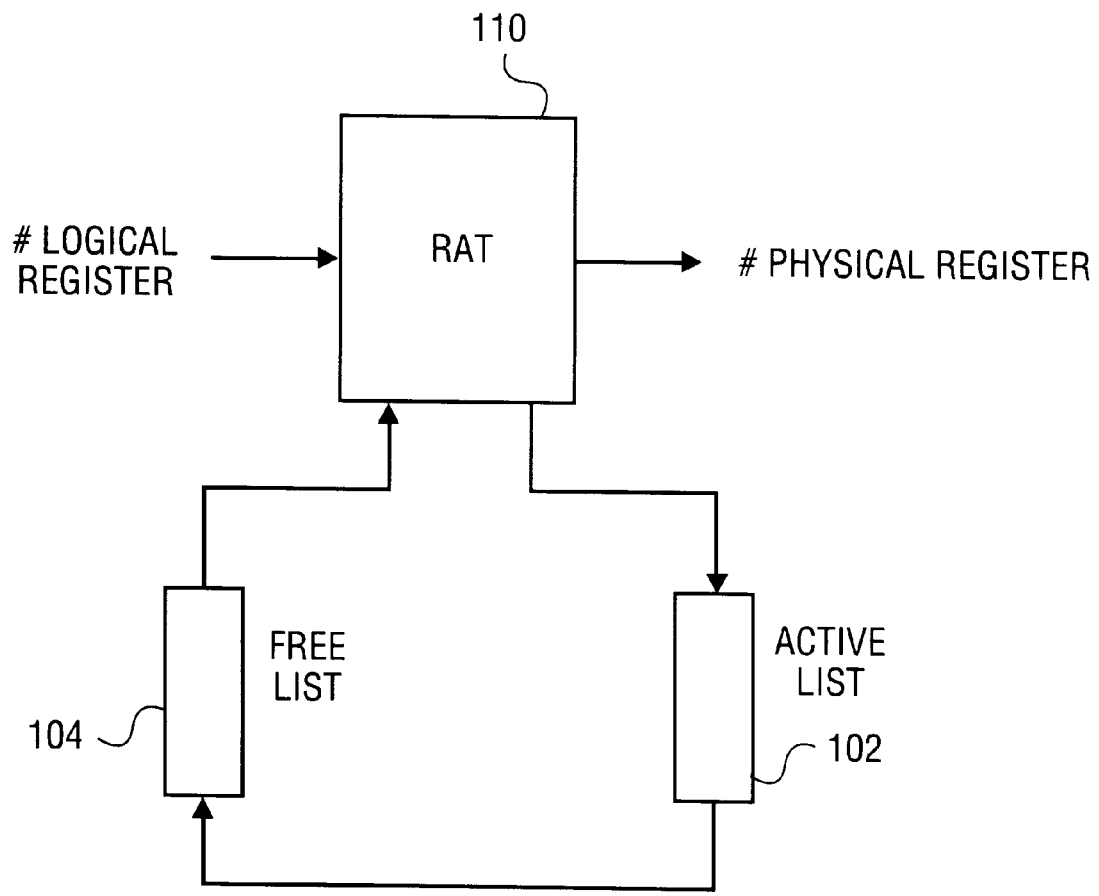
FIG. 1 illustrates a prior art register renaming and dependency tracking scheme.

In this way, the use of set of counters 222 ensures that no physical register is lost during the cycle depicted in FIG. 1. The maximum number of concurrent mappings to a given physical register depends upon the number of bits allocated to its associated counter. Note that there may be more mappings than there are logical registers, because the number of instructions in flight may (and most likely will) be larger than the number of logical registers.

Table 2 provides an example of register re-use for a register-to-register move instruction. Table 2 is similar to Table 1, except that the third instruction is changed to a register-to-register move instruction, and an additional column is added to indicate the current state of the physical register counters.

The first entry in Table 2 provides the current state of the RAT and the physical register counters before the first display instruction is renamed. In this example, a counter value of zero indicates that its associated physical register is free. Note that initially, physical registers PR2, PR12, and PR14 are free and available for new mappings because their counter values are each zero.

Next to each renamed instruction is a pointer indicating the physical register named in the evicted mapping. For example, when the first displayed instruction is placed in the instruction window buffer, the pointer field associated with its entry is set to point to physical register PR1 because the renamed instruction evicted the mapping LRa→PR1. Furthermore, because physical register PR2 has now been allocated in the new mapping LRa→PR2, its counter is incremented by one.

The third displayed instruction in Table 2 is a register-to-register move and re-uses physical register PR12 so that its destination logical register is mapped to the same physical register mapped by its source logical register. Execution of this move instruction is performed by the renaming, but an entry in the instruction buffer window is still provided so that the pointer field associated with its entry is set to point to physical register PR10. Note that the counter for physical register PR12 is incremented from one to two (its value was set to one in the previous instruction).

As described previously, for some embodiments when an instruction retires, the counter pointed to by its associated pointer field is decremented. As a simple example, suppose in Table 2 the instruction window has only the four instructions displayed, and the first displayed instruction is retired. Because the first renamed instruction has a pointer to physical register PR1, the counter for physical register PR1 is decremented from one to zero, and physical register PR1 is now free to be used again.

TABLE 2

| Instruction | Renamed Instruction with pointer | RAT | Evicted Mapping | Counters |
|---|---|---|---|---|
| ... | ... | LRa → PR1 | ... | $C_1 = 1$ $C_{11} = 1$ |
| | | LRb → PR11 | | $C_2 = 0$ $C_{12} = 0$ |
| | | LRc → PR10 | | $C_{10} = 2$ $C_{14} = 0$ |
| LRa + 2 → LRa | PR1 + 2 → PR2; 1 | LRa → PR2 | LRa → PR1 | $C_1 = 1$ $C_{11} = 1$ |
| | | LRb → PR11 | | $C_2 = 1$ $C_{12} = 0$ |
| | | LRc → PR10 | | $C_{10} = 2$ $C_{14} = 0$ |
| LRa + 3 → LRb | PR2 + 3 → PR12; 1 | LRa → PR2 | LRb → PR11 | $C_1 = 1$ $C_{11} = 1$ |
| | | LRb → PR12 | | $C_2 = 1$ $C_{12} = 2$ |
| | | LRc → PR10 | | $C_{10} = 2$ $C_{14} = 0$ |
| LRb → LRc | PR12 → PR12; 10 | LRa → PR2 | LRc → PR10 | $C_1 = 1$ $C_{11} = 1$ |
| | | Lrb → PR12 | | $C_2 = 1$ $C_{12} = 2$ |
| | | LRc → PR12 | | $C_{10} = 2$ $C_{14} = 0$ |
| LRa + 5 → LRb | PR2 + 5 → PR14; 12 | LRa → PR2 | LRb → PR12 | $C_1 = 1$ $C_{11} = 1$ |
| | | LRb → PR14 | | $C_2 = 1$ $C_{12} = 2$ |
| | | LRc → PR12 | | $C_{10} = 2$ $C_{14} = 1$ |

Figure 3:
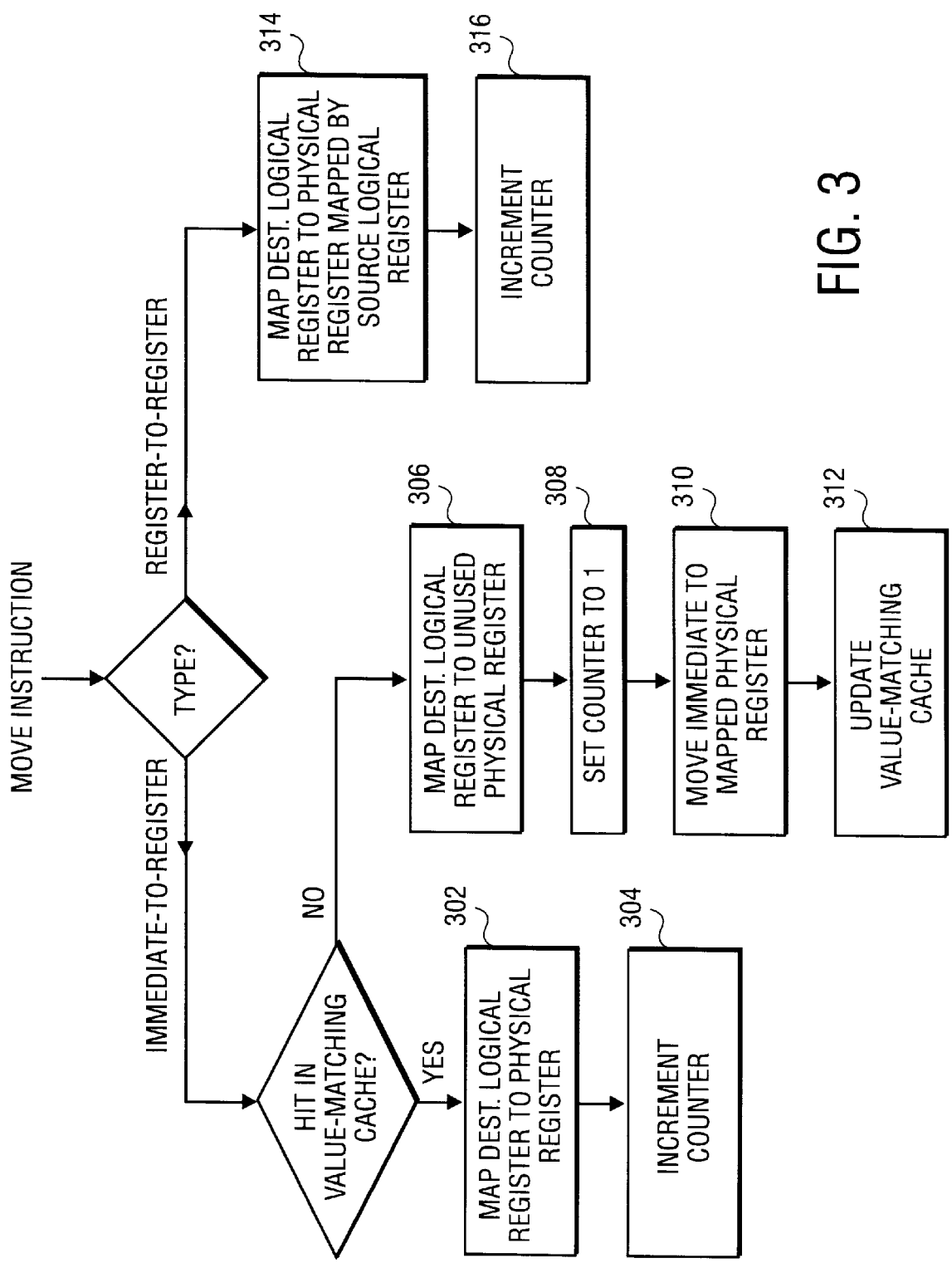
FIG. 3 illustrates a flow diagram for executing move instructions according to an embodiment of the present invention.

A flow diagram illustrating the execution of move instructions for some embodiments is shown in FIG. 3. If the move is an immediate-to-register move and there is a hit in value-matching cache 224, then the destination logical register of the move instruction is mapped (302) to the physical register indicated in value-matching cache 224 and its counter is incremented (304). However, if there is not a hit in value-matching cache 224, then the destination logical register is mapped (306) to a free physical register, e.g., a physical register having a counter value equal to zero is allocated, its counter value is set to one (308), the immediate is moved (310) to the allocated physical register when the move is executed, and value-matching cache 224 is updated (312) to indicate that the immediate is now stored in the allocated physical register. In general, for the present embodiment, value-matching cache 224 is updated every time a new result is generated and stored in a physical register. If the move instruction is a register-to-register move, then the destination logical register is mapped (314) to the same physical register to which the source logical register is mapped, and its counter is incremented (316).

If an entry in value-matching cache 224 points to a physical register that is later allocated for a new mapping, then such an entry should be removed or indicated as invalid in value-matching cache 224. However, it may happen that the same immediate associated with the invalidated (or removed) entry will again be an immediate for a subsequent immediate-to-register move instruction, in which case a new physical register will be allocated and mapped. Some efficiency may therefore be realized by an allocation strategy in which free physical registers not pointed to by an entry in value-matching cache 224 are allocated before free physical registers pointed to by an entry.

Various modifications may be made to the disclosed embodiments without departing from the scope of the invention as claimed below. In the claims below, the term "instruction" may encompass an instruction in a RISC architecture or an instruction in a CISC architecture, as well as instructions used in other computer architectures.

We claim:

1. A microprocessor comprising:
   a physical register file comprising physical registers;
   a decoder to decode a register-to-register move instruction indicating a source logical register and a destination logical register;
   a register allocation table to map the destination logical register to a physical register to which the source logical register is mapped; and
   a plurality of counters in one-to-one correspondence with the physical registers, each counter to indicate a number of mappings to its corresponding physical register.

2. The microprocessor as set forth in claim 1, wherein each counter is changed if a new mapping to its corresponding physical register is created in the register allocation table.

3. The microprocessor as set forth in claim 1, wherein each counter is incremented if a new mapping to its corresponding physical register is created in the register allocation table.

4. The microprocessor as set forth in claim 1, wherein associated with the register-to-register move instruction is a pointer field to point to a physical register mapped in a mapping evicted by the register-to-register move instruction.

5. The microprocessor as set forth in claim 4, further comprising a buffer to retire the register-to-register move instruction in program order, wherein the buffer is coupled to the physical register file so that a counter corresponding to the physical register pointed to by the pointer field is changed if the register-to-register instruction is retired.

6. The microprocessor as set forth in claim 4, further comprising a buffer to retire the register-to-register move instruction in program order, wherein the buffer is coupled to the physical register file so that a counter corresponding to the physical register pointed to by the pointer field is decremented if the register-to-register instruction is retired.

7. A microprocessor comprising:
   a decoder to decode a register-to-register move instruction indicating a source logical register and a destination logical register;
   a register allocation table;
   a renamer to create a mapping in the register allocation table, wherein the mapping maps the destination logical register to a physical register, wherein the source logical register maps to the physical register; and
   a plurality counters in one-to-one correspondence with the physical registers, each counter to indicate a number of mappings to its corresponding physical register.

8. The microprocessor as set forth in claim 7, wherein associated with the register-to-register move instruction is a pointer field to point to a physical register mapped in a mapping evicted by the register-to-register move instruction.

9. The microprocessor as set forth in claim 8, further comprising a buffer to retire the register-to-register move instruction in program order, wherein the buffer is coupled to the physical register file so that a counter corresponding to the physical register pointed to by the pointer field is changed if the register-to-register instruction is retired.

10. The microprocessor as set forth in claim 8, further comprising a buffer to retire the register-to-register move instruction in program order, wherein the buffer is coupled to the physical register file so that a counter corresponding to the physical register pointed to by the pointer field is decremented if the register-to-register instruction is retired.

11. A microprocessor comprising:
- a physical register file comprising physical registers;
- a decoder to decode an immediate-to-register move instruction indicating an immediate and a destination logical register;
- a register allocation table; and
- a cache, wherein entries in the cache associate values with physical registers storing the values; and
- a register allocation table to map the destination logical register to a physical register when the immediate-to-register move instruction is decoded and the cache indicates that the physical register already stores the immediate.

12. The microprocessor as set forth in claim 14, further comprising a plurality of counters in one-to-one correspondence with the physical registers, each counter to indicate when its corresponding physical register is free.

13. The microprocessor as set forth in claim 12, wherein for each counter, a counter is changed when a new mapping to its corresponding physical register is created in the register allocation table.

14. The microprocessor as set forth in claim 12, wherein for each counter, a counter is incremented when a new mapping to its corresponding physical register is created in the register allocation table.

15. The microprocessor as set forth in claim 12, wherein associated with the immediate-to-register move instruction is a pointer field to point to a physical register mapped in a mapping evicted by the immediate-to-register move instruction.

16. The microprocessor as set forth in claim 15, further comprising a buffer to retire the immediate-to-register move instruction in program order, wherein the buffer is coupled to the physical register file so that a counter corresponding to the physical register pointed to by the pointer field is changed if the immediate-to-register move instruction is retired.

17. The microprocessor as set forth in claim 15, further comprising a buffer to retire the immediate-to-register move instruction in program order, wherein the buffer is coupled to the physical register file so that a counter corresponding to the physical register pointed to by the pointer field is decremented if the immediate-to-register move instruction is retired.

18. The microprocessor as set forth in claim 11, further comprising:
- a renamer to, if the cache indicates that a physical register stores the immediate when the immediate-to-register move instruction is decoded, create a mapping in the register allocation table to map the destination logical register to the physical register.

19. The microprocessor as set forth in claim 18, further comprising a plurality of counters in one-to-one correspondence with the physical registers, each counter to indicate when its corresponding physical register is free.

20. The microprocessor as set forth in claim 19, wherein associated with the immediate-to-register move instruction is a pointer field to point to a physical register mapped in a mapping evicted by the immediate-to-register move instruction.

21. The microprocessor as set forth in claim 20, further comprising a buffer to retire the immediate-to-register move instruction in program order, wherein the buffer is coupled to the physical register file so that a counter corresponding to the physical register pointed to by the pointer field is changed if the immediate-to-register move instruction is retired.

22. The microprocessor as set forth in claim 20, further comprising a buffer to retire the immediate-to-register move instruction in program order, wherein the buffer is coupled to the physical register file so that a counter corresponding to the physical register pointed to by the pointer field is decremented if the immediate-to-register move instruction is retired.

23. A method to process a register-to-register move instruction, the register-to-register move instruction indicating a source logical register and a destination logical register, the method comprising:
- mapping the source logical register to a physical register;
- mapping the destination logical register to the physical register while the source logical register is still mapped to the physical register; and
- changing a counter corresponding to the physical register to indicate an additional mapping to the physical register.

24. A method to process an immediate-to-register move instruction, the immediate-to-register move instruction indicating an immediate and a destination logical register, the method comprising:
- accessing a cache to determine if the immediate is stored in a physical register; and
- if the cache indicates that the immediate is already stored in a physical register, mapping the destination logical register of the immediate-to-register move instruction to the physical register storing the immediate.

* * * * *

UNITED STATES PATENT AND TRADEMARK OFFICE
CERTIFICATE OF CORRECTION

PATENT NO. : 6,594,754 B1
DATED : July 15, 2003
INVENTOR(S) : Jourdan et al.

It is certified that error appears in the above-identified patent and that said Letters Patent is hereby corrected as shown below:

<u>Column 8,</u>
Line 19, delete "each" and insert -- for each counter, a --.
Line 23, delete "each" and insert -- for each counter, a --.

<u>Column 9,</u>
Line 9, "a register allocation table; and".

Signed and Sealed this

Twenty-third Day of March, 2004

JON W. DUDAS
*Acting Director of the United States Patent and Trademark Office*